United States Patent
Pizon (10) Patent No.: US 10,246,150 B2
(45) Date of Patent: Apr. 2, 2019

(54) IDLER ASSEMBLY FOR A TRACK ROLLER FRAME

(71) Applicant: Caterpillar Inc., Peoria, IL (US)

(72) Inventor: Alain Pizon, Revel (FR)

(73) Assignee: Caterpillar Inc., Deerfield, IL (US)

( * ) Notice: Subject to any disclaimer, the term of this patent is extended or adjusted under 35 U.S.C. 154(b) by 356 days.

(21) Appl. No.: 15/115,017

(22) PCT Filed: Jan. 28, 2015

(86) PCT No.: PCT/US2015/013226
§ 371 (c)(1),
(2) Date: Jul. 28, 2016

(87) PCT Pub. No.: WO2015/116643
PCT Pub. Date: Aug. 6, 2015

(65) Prior Publication Data
US 2016/0368550 A1   Dec. 22, 2016

(30) Foreign Application Priority Data

Jan. 28, 2014 (GB) .................................. 1401401.3

(51) Int. Cl.
*B62D 55/30*   (2006.01)
*B62D 55/14*   (2006.01)
(Continued)

(52) U.S. Cl.
CPC ............. *B62D 55/30* (2013.01); *B62D 55/14* (2013.01); *B62D 55/15* (2013.01); *B62D 55/305* (2013.01);
(Continued)

(58) Field of Classification Search
CPC ............................... B62D 55/10; B62D 55/30
See application file for complete search history.

(56) References Cited

U.S. PATENT DOCUMENTS

| | | | |
|---|---|---|---|
| 2,926,969 A | 3/1960 | Ashley, Jr. | |
| 3,907,382 A | 9/1975 | Kessinger, Jr. | |

(Continued)

FOREIGN PATENT DOCUMENTS

| CN | 101224763 | 7/2008 |
|---|---|---|
| CN | 101517268 | 8/2009 |

(Continued)

OTHER PUBLICATIONS

International Search Report for related International Application No. PCT/US2015/013226; report dated May 28, 2015.

(Continued)

*Primary Examiner* — Jason R Bellinger
(74) *Attorney, Agent, or Firm* — Miller, Matthias & Hull; Jeff A. Greene (57) ABSTRACT

An idler assembly for a track roller frame includes a housing element having a central cavity, the housing element being connectable to an end of the track roller frame. A yoke element is movably disposed in central cavity and has spaced apart first and second arms, the yoke element is connectable to a longitudinally extending piston in the track roller frame. At least one key element couples the yoke element to the housing element such that the yoke element is movable relative to the housing element. An idler wheel is rotatably supported between the first and second arms.

15 Claims, 6 Drawing Sheets

(51) Int. Cl.
*B62D 55/15* (2006.01)
*B62D 55/32* (2006.01)
*B62D 55/06* (2006.01)
*E02F 3/76* (2006.01)

(52) U.S. Cl.
CPC .............. *B62D 55/32* (2013.01); *B62D 55/06* (2013.01); *E02F 3/7609* (2013.01)

(56) References Cited

U.S. PATENT DOCUMENTS

| | | | | |
|---|---|---|---|---|
| 4,406,501 | A | * | 9/1983 | Christensen ........... B62D 55/08 305/125 |
| 6,224,172 | B1 | | 5/2001 | Goodwin |
| 7,226,137 | B2 | * | 6/2007 | Fornes ................. B62D 55/305 180/9.52 |
| 7,252,349 | B2 | * | 8/2007 | Livesay ............... B62D 55/305 305/143 |
| 7,866,420 | B1 | | 1/2011 | Claas et al. |
| 7,980,639 | B2 | * | 7/2011 | Matthys ............... B62D 55/088 305/107 |
| 2006/0049692 | A1 | | 3/2006 | Livesay et al. |
| 2007/0029878 | A1 | * | 2/2007 | Gaudreault .......... A01G 23/062 305/130 |
| 2013/0154346 | A1 | | 6/2013 | Beasley et al. |
| 2013/0154347 | A1 | | 6/2013 | Beasley et al. |
| 2016/0176455 | A1 | * | 6/2016 | Nuechterlein ......... B62D 55/14 305/125 |

FOREIGN PATENT DOCUMENTS

| | | |
|---|---|---|
| DE | 4323912 A1 | 1/1995 |
| DE | 102005043341 A1 | 5/2006 |
| JP | 2000085647 A | 3/2000 |
| JP | 2012001011 A | 1/2012 |
| KR | 200442650 Y1 | 12/2008 |
| WO | WO-2013/095795 A1 | 6/2013 |

OTHER PUBLICATIONS

Search Report for related UK Application No. 1401401.3; report dated Aug. 22, 2014.

* cited by examiner

IDLER ASSEMBLY FOR A TRACK ROLLER FRAME

CROSS-REFERENCE TO RELATED APPLICATION

This Application is a 35 USC § 371 US National Stage filing of International Application No. PCT/US2015/013226 filed on Jan. 28, 2015, and claims priority under the Paris Convention to UK Patent Application No. 1401401.3 filed on Jan. 28, 2014.

TECHNICAL FIELD

This disclosure relates to track type machines, in particular to track roller frames for track type machines and more particularly to idler assemblies for track roller frames.

BACKGROUND

Track type machines, for example dozers, excavators, and skid-steer loaders, may be commonly used in applications where traction is critical or low ground pressure is important. These machines may include a frame that supports an internal combustion engine, and left and right track roller frames that transfer power from the engine to a ground surface.

The left and right track roller frames may be rigidly mounted at one end to the frame and may be free to pivot in a vertical direction about the mounting location. The track roller frame may be connected to the frame by a pivot shaft. The pivot shaft may be provided on the frame and may extend through an opening in the track roller frame.

Each of the track roller frames may include a front idler wheel and a rear idler wheel and a roller around which a track may be positioned. The track roller frames may constitute a rugged construction that exhibit a high degree of structural integrity in order to support the vehicle.

Each of the track roller frames may include a drive sprocket that is driven by the engine. The drive sprocket may be positioned either elevated with respect to the front and rear idler wheels or in line with an idler wheel.

The present disclosure is directed, at least in part, to improving or overcoming one or more aspects of the prior art system.

BRIEF SUMMARY OF THE INVENTION

In a first aspect, the present disclosure describes an idler assembly that comprises a housing element having a central cavity, the housing element being connectable to an end of the track roller frame. A yoke element may be movably disposed in central cavity and has spaced apart first and second arms, the yoke element may be connectable to a longitudinally extending piston in the track roller frame. At least one key element may couple the yoke element to the housing element such that the yoke element is movable relative to the housing element. An idler wheel may be rotatably supported between the first and second arms.

In a second aspect, the present disclosure describes a method of assembling an idler assembly to a track roller frame. The method may comprise the steps of connecting a housing element to an end of the track roller frame, the housing element having a central cavity; connecting a yoke element to a longitudinally extending piston provided in the track roller frame, the yoke element having spaced apart first and second arms; disposing the yoke element in the central cavity; coupling the yoke element to the housing element wherein the yoke element is movable relative to the housing element, the yoke element being coupled to the housing element by at least one key element; and supporting an idler wheel rotatably between the first and second arms.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

Figure 1:
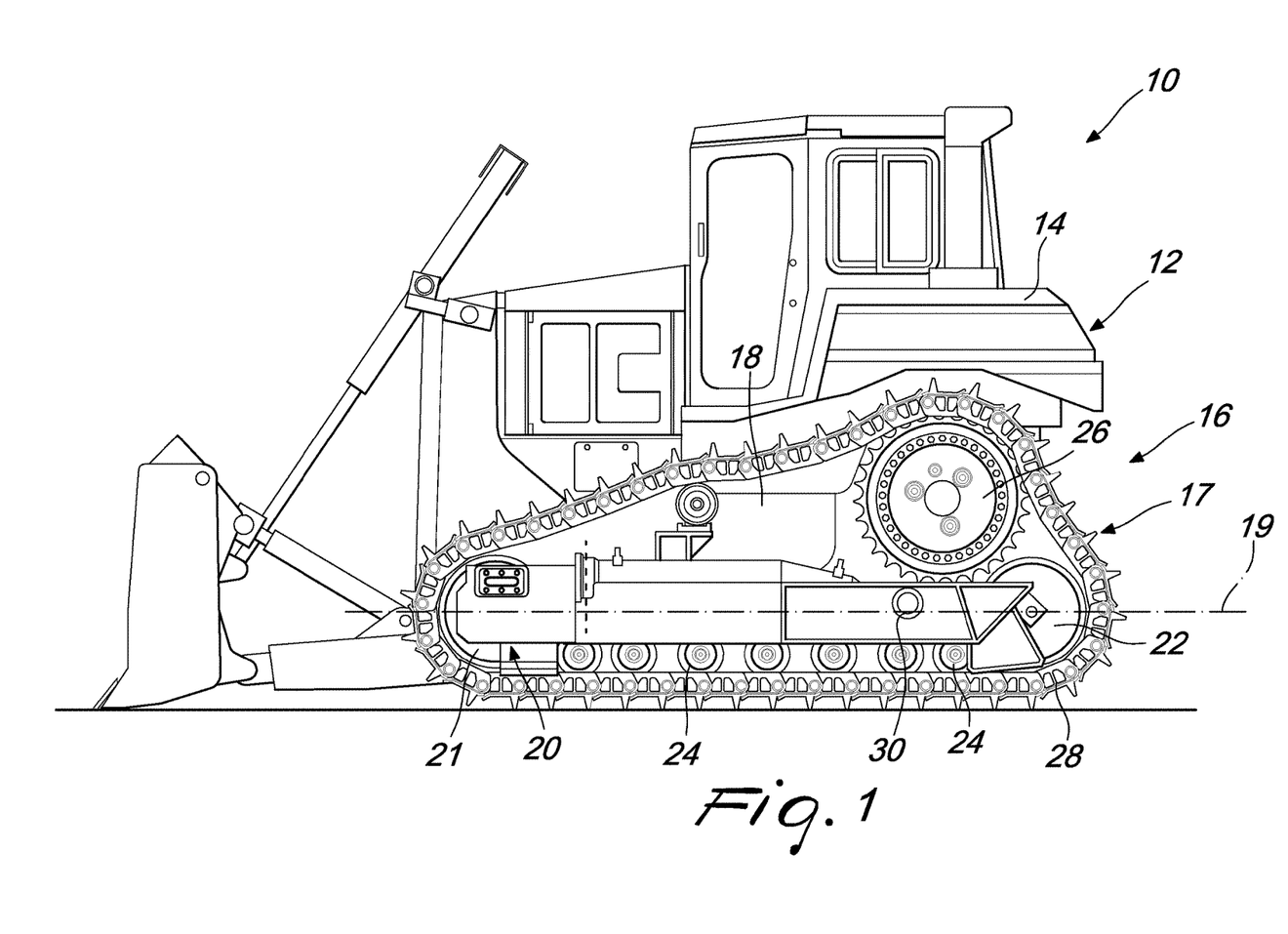
FIG. 1 is a side view of a track type machine comprising a track roller frame and an idler assembly according to the present disclosure.

This disclosure generally relates to an idler assembly for a track roller frame. With reference to FIG. 1, a track type machine 10 may include a main frame 12 having a first side 14 and a second side (not shown). The machine 10 may include an undercarriage 16 which includes a first track roller assembly 17 and a second track roller assembly (not shown). The track roller assemblies may be mutually spaced apart. The first and second track roller assemblies may be spaced from and adjacent to respective first and second sides of the main frame 12.

FIG. 1 illustrates the first track roller assembly 17 which will be hereinafter described and the detailed features of the first track roller assembly 17 will be applicable to the second track roller assembly.

The first track roller assembly 17 may include a track roller frame 18. Track roller frame 18 may form a substantially hollow support structure that at least partially houses the remaining components of the track roller assembly 17 and may transfer loads from the main frame 12 to a track chain 28. Track roller frame 18 may have a longitudinal axis 19. In an embodiment, track roller frame 18 may be a single fabricated or cast component.

The first track roller assembly 17 may include the idler assembly 20 having a first idler wheel 21, a second idler wheel 22 and a plurality of guide rollers 24. A drive sprocket 26 may be positioned on each side of the machine 10 and may be powered in forward and reverse directions. The drive sprocket 26 may be rotatably supported by the main frame 12 in longitudinal alignment with the respective track frame. The idler assembly 20 may be located at the forward or front portion of the machine 10. Idler assembly 20 may extend longitudinally from the track roller frame 18. The first idler wheel 21 may be the front idler wheel of the machine 10 with respect to the forward travelling direction of the machine 10.

Track chain 28 may encircle drive sprocket 26, the first and second idler wheels 21, 22, and the guide rollers 24. The track chain 28 may include a plurality of interconnected track links and a plurality of track shoes secured to the track links. The guide rollers 24 may guide the track links as the track chain 28 is driven by the drive sprocket 26.

The first track roller assembly 17 may be coupled to the main frame 12 by a pivot shaft 30. The pivot shaft 30 may couple the track roller frame 18 to the first side 14 of the main frame 12. A second pivot shaft (not shown) may couple the second roller track frame to the second side of the main frame 12.

First and second track roller frames may be mounted for pivotal swinging movement on the opposite sides of the main frame 12. First and second pivot shafts may be rigidly connected at respective proximal portions to the main frame 12, and may be pivotally coupled to the respective track roller frames at respective distal portions.

In an embodiment, the pivot shaft 30 may extend transversely through the main frame 12 and may be rigidly coupled thereto. The central portion of the pivot shaft 30 may be rigidly secured to the main frame 12 and opposite distal portions may be pivotally coupled to the respective track roller frames at respective distal portions.

Figure 2:
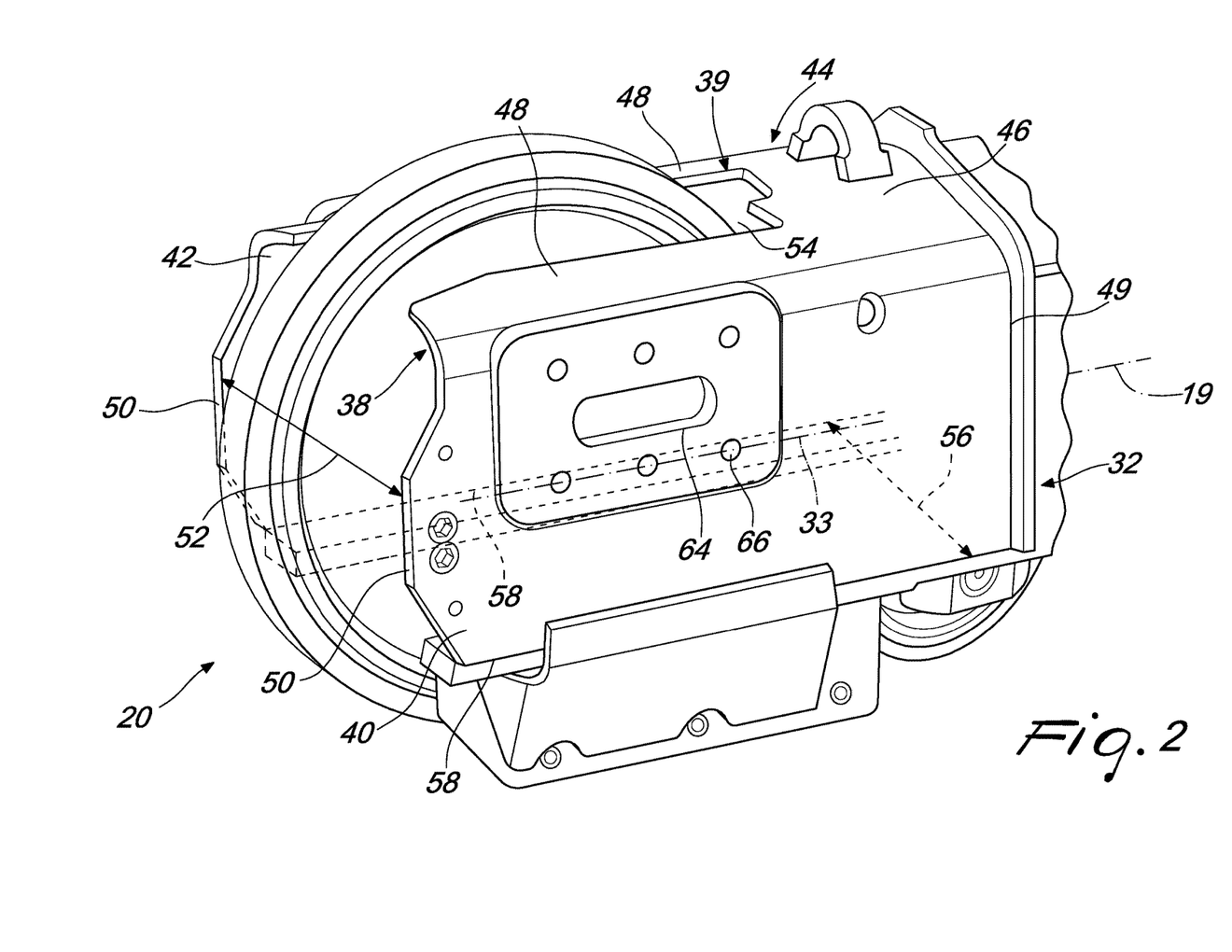
FIG. 2 is an isometric view of the idler assembly according to the present disclosure.
Figure 3:
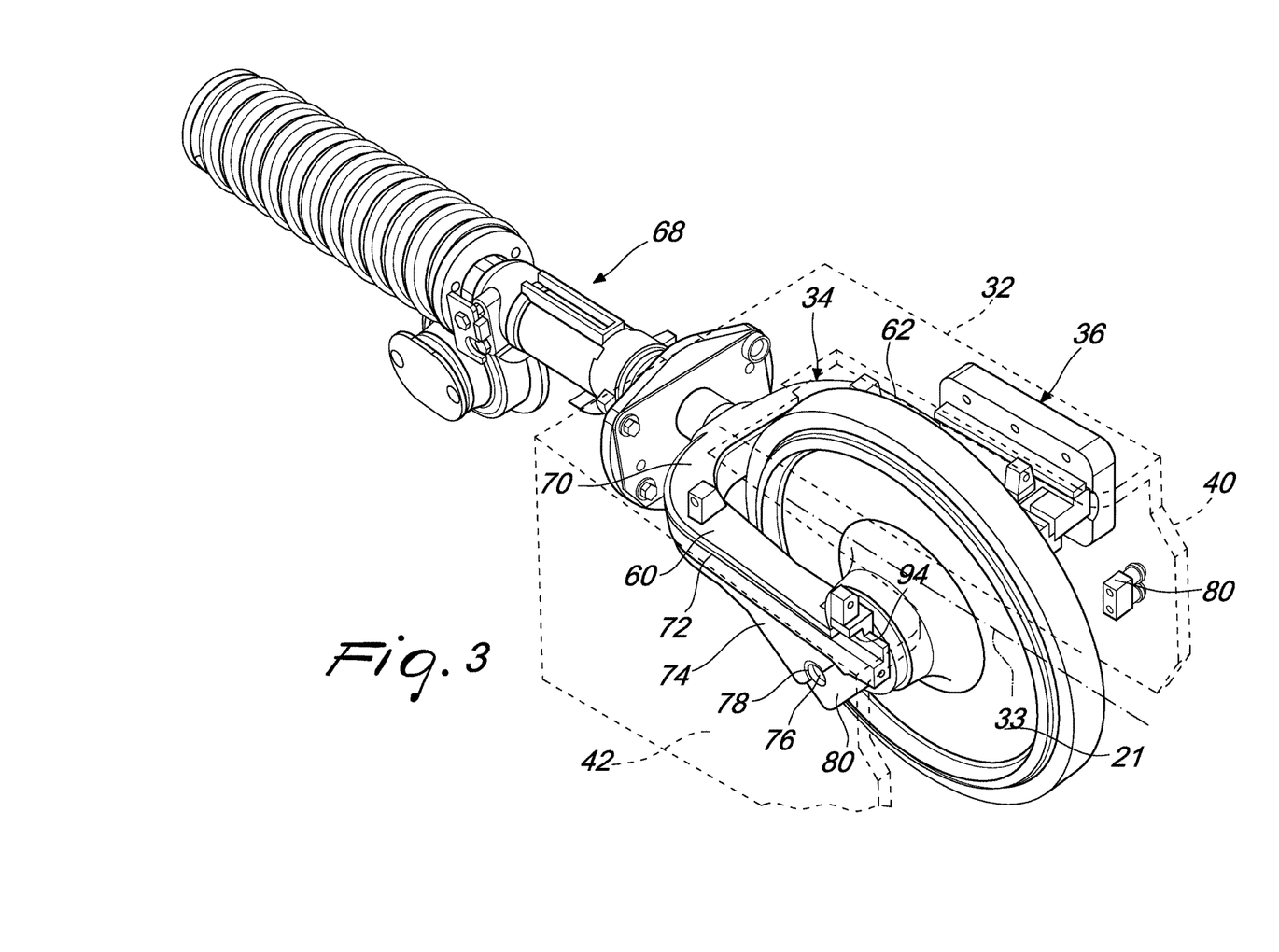
FIG. 3 is an isometric of a partially disassembled idler assembly connected to a piston according to the present disclosure.

FIGS. 2 and 3 illustrate the idler assembly 20. Idler assembly 20 may have a housing element 32, a yoke element 34, at least one key element 36 and the idler wheel 21.

With reference to FIG. 2, housing element 32 may be connectable to an end of the track roller frame 18. Housing element 32 may be connectable to a front end of the track roller frame 18. The front end of the track roller frame 18 may correspond to the portion thereof orientated to face the direction of forward travel of the machine 10.

In an embodiment, the housing element 32 may be connected to the track roller frame 18 by known fastening methods, such as welding. Housing element 32 may have a longitudinal axis 33. With the housing element 32 connected to the track roller frame 18, the longitudinal axis 33 may be parallel to the longitudinal axis 19. In an embodiment, longitudinal axis 33 may be coincident with longitudinal axis 19.

The housing element 32 may comprise a central cavity 38. Central cavity 38 may extend longitudinally in the housing element 32. The central cavity 38 may extend along the longitudinal axis 33. The housing element 32 may at least partially accommodate the first idler wheel 21. Idler wheel 21 may be accommodated in the central cavity 38. Housing element 32 may be provided with an opening 39. Central cavity 38 may be open to the exterior of the housing element 32 through an opening 39. The idler wheel 21 may protrude from the housing element 32 thorough opening 39 to engage the track chain 28.

The housing element 32 may have a first side 40 and a second side 42. The first and second sides 40, 42 may be opposed to each other. First and second sides 40, 42 may be vertically orientated with respect to the operational position of the track roller frame 18. The longitudinal axes of the first and second sides 40, 42 may be parallel to the longitudinal axis 33. In the housing element 32 connected to the track roller frame 18, longitudinal axes of the first and second sides 40, 42 may be parallel to the longitudinal axis 19 of the track roller frame 18 and the transverse axes of the first and second sides 40, 42 may be perpendicular to the longitudinal axis 19.

First side 40 may be substantially parallel to second side 42. First and second sides 40, 42 may be substantially parallel to the first idler wheel 21. First and second sides 40, 42 may be substantially panel like. First and second sides 40, 42 may be substantially rectangular. First and second sides 40, 42 may have mounting ends 49 configured for connection to the track roller frame 18. Opposite the mounting ends 49 the track roller frame 18 has free ends 50. First side 40 and second side 42 may have mounting edges 58 for mounting to the track roller frame 18.

First side 40 and second side 42 may be connected by a transverse side 44. Transverse side 44 may have a u-shaped structure with a base 46 and parallel legs 48. The legs 48 may be connected to the base 46 at both terminal ends thereof. Base 46 may extend between the first and second sides 40, 42. Base 46 may be substantially perpendicular to the longitudinal axis 33. Legs 48 may be connected to the respective edges of the first and second sides 40, 42.

A first gap 52 may be provided between the free ends 50. The longitudinal axis 19 of the track roller frame 18 may intersect a plane formed on the first gap 52. Longitudinal axis 19 of the track roller frame 18 may be perpendicular to the plane formed on the first gap 52. A second gap 56 may be provided between the free mounting edges 58. Longitudinal axis 19 may be parallel to a plane formed on the second gap 56. First gap 52 may adjoin with second gap 56.

A cut-out 54 may be provided on the transverse side 44. The cut-out 54 may be bound on three sides by the base 46 and the legs 48. The cut-out 54 may communicate with the gap 52. Cut-out 54 may adjoin with the gap 52 at the side opposite the base 46. The opening 39 may be formed on the housing element 32 by the combination of the first and second gaps 52, 56 and cut-out 54.

Transverse side 44 may have a raised central apex with respect to the operational position of the track roller frame 18. The centre of the base 46 may be raised with respect to the opposite ends thereof. Base 46 may have inclined portions positioned between the centre portion and end portions that are connected to the first and second sides 40, 42. Legs 48 may be inclined along the respective transverse axes.

An aperture 64 may be provided on the first side 40. In an embodiment, apertures 64 may be provided on both first and second sides 40, 42. Apertures 64 may be elongated in the direction of the longitudinal axis 33. Apertures 64 may be rectangular in shape. Apertures 64 may be formed on raised portions that extend from the outer surfaces of the first and second sides 40, 42. Two rows of bores 66 may be provided on both sides of the aperture 64. Bores 66 may be provided on both first and second sides 40, 42.

FIG. 3 illustrates the yoke element 34 that may be disposed in the central cavity 38. Yoke element 34 may be movably disposed in central cavity 38. The yoke element 34 may have a first arm 60 and a second arm 62. First arm 60 may be spaced apart from the second arm 62. First arm 60 may be spaced apart from the second arm 62 in the transverse direction with respect to the longitudinal axis 33. Idler wheel 21 may be rotatably supported between the first and second arms 60, 62.

First and second arms 60, 62 may extend longitudinally in a direction of extension of the first and second sides 40, 42. First and second arms 60, 62 may be parallel to the first and second sides 40, 42. First and second arms 60, 62 may be parallel to the longitudinal axis 33. First and second arms 60, 62 may be formed as a single fabricated or cast component.

First and second arms 60, 62 may have inner surfaces that face idler wheel 21. First and second arms 60, 62 may have outer surfaces that are opposite the inner surfaces and that face the first and second sides 40, 42. The outer surfaces may be parallel to the surfaces of the first and second sides 40, 42.

First and second arms 60, 62 may be aligned to the apertures 64 provided on the first and second sides 40, 42.

The outer surfaces of the first and second arms 60, 62 may be aligned to the apertures 64 in the vertical direction.

The yoke element 34 may be connectable to a piston 68 that is provided in the track roller frame 18. Piston 68 may extend from a piston chamber in a mid-section of the track roller frame 18 (not shown). Piston may be under compression by grease in the piston chamber (not shown). The piston 68 may extend longitudinally from the track roller frame 18 in a direction along the longitudinal axis 19. Yoke element 34 may be rigidly connected to the piston 68 by known methods.

A base 70 of the yoke element 34 may bear against the piston 68. The base 70 may be formed as a c-shaped structure. Respective terminal ends of base 70 may be connected to the first and second arms 60, 62. Yoke element 34 may be longitudinally movable relative to the housing element 32. Yoke element 34 may be movable such that idler wheel 21 may be biased away from the track roller frame 18 and toward the track chain 28 by the piston 68. Yoke element 34 may be moved toward the track roller frame 18 so as to accommodate external forces acting on the track chain 28.

Yoke element 34 may have at least one slot 72 provided on the first arm 60 or the second arm 62. Slot 72 may be longitudinally extending along the first or second arm 60, 62. The slot 72 may face a side of housing element 32. Slot 72 may be aligned to the aperture 64 provided on either the first side 40 or second side 42. Yoke element 34 may be longitudinally movable relative to the housing element 32 in the direction of the slot 72.

Yoke element 34 may have slots 72 provided on the first arm 60 and the second arm 62. Slots 72 may be mutually aligned and mutually parallel. The slots 72 may face respective first or second sides 40, 42. The slots 72 may face inner faces of the respective first or second sides 40, 42. Slots 72 may longitudinally extend along the outer surfaces of the first and second arms 60, 62. Slots 72 may be substantially parallel to the longitudinal axis 33 of the housing element 32. Slots 72 may extend from the free ends of the first or second sides 40, 42 to the ends connected to the base 70. In an embodiment, slots 72 may extend from the free ends of the first or second sides 40, 42 and into the base 70. Slots 72 may be aligned to the apertures 64 provided on the first side 40 and second side 42. In an embodiment, slots 72 may have a cross section that is substantially a square.

A brace portion 74 may extend from each of the first and second arms 60, 62. Brace portions 74 may extend away from the first and second arms 60, 62 substantially in a direction perpendicular to the longitudinal axis 33. Brace portions 74 may extend downwardly from the first and second arms 60, 62. Brace portions 74 may extend away from the transverse side 44.

Brace portions 74 may be connected to the idler wheel 21. Brace portions 74 may be substantially parallel to idler wheel 21. Idler wheel 21 may be rotatably connected to the brace portions through an axle 76. Axle 76 may pass through a center of idler wheel 21 and engage brace portions 74 to rotationally support the idler wheel 21 between first and second arms 60, 62.

End portions of the axle 76 may be accommodated in notches 78 provided on the brace portions 74. Notches 78 may be provided on free edges of the brace portions 74 that are opposite edges connected to the first and second arms 60, 62. Notches 78 may be formed as partial cutouts in the brace portions 74.

Axle 76 may be retained in the notches 78 by brackets 80. Brackets 80 may engage brace portions 74 at the notches 78 to retain axle 76. The brackets 80 may be bolted to the free edges of the brace portions 74.

The at least one key element 36 may couple the yoke element 34 to the housing element 32. Key element 36 may determine the position yoke element 34 relative to the housing element 32. The key element 36 may couple the yoke element 34 to the housing element 32 such that the yoke element 34 is movable relative to the housing element 32.

The key element 36 may be coupled to either the first or second side 40, 42. Key element 36 may be bolted to either the first or second side 40, 42. Key element 36 may be positioned at the aperture 64. In an embodiment, two key elements 36 may couple the yoke element 34 to the housing element 32. The key elements 36 may be coupled to both the first and second sides 40, 42.

Figure 4:
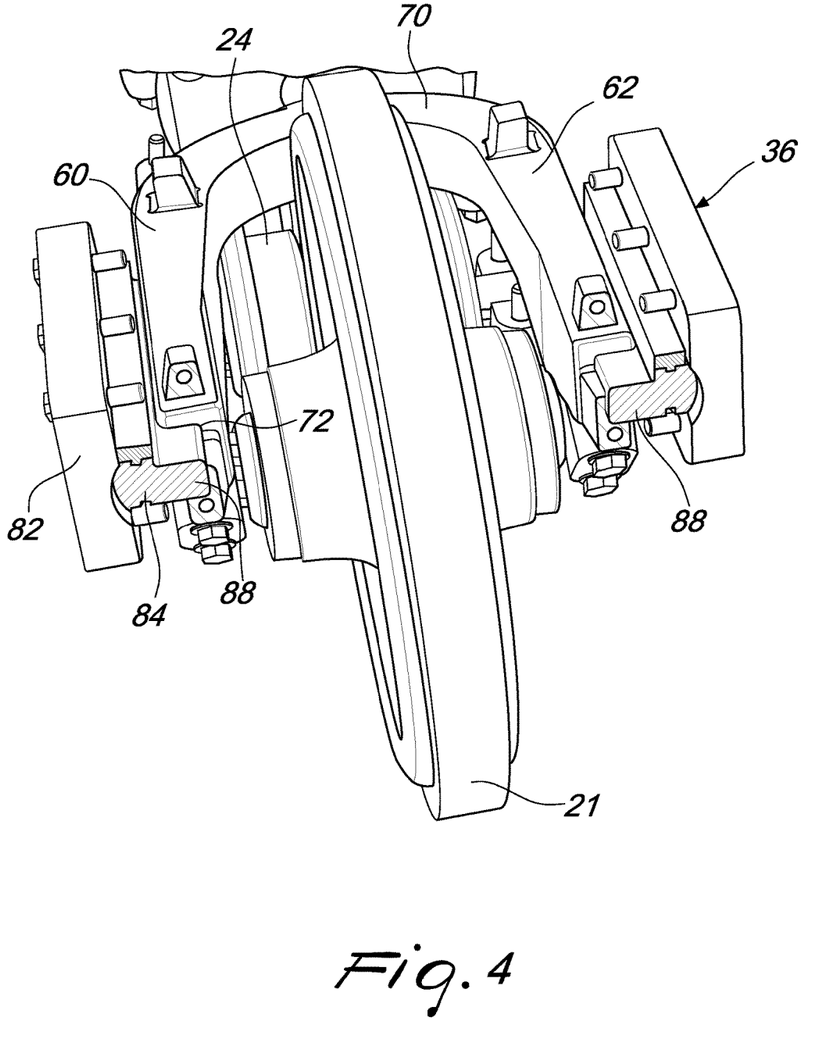
FIG. 4 is an isometric view of the idler assembly without the housing element according to the present disclosure.

With reference to FIG. 4, each key element 36 may comprise a panel portion 82 and a flange portion 84. The flange portion 84 may extend from a surface of the panel portion 82. Flange portions 84 may extend from respective inner sides of the panel portions 82 that contact the first and second sides 40, 42. Flange portion 84 may be centrally positioned on the panel portion 82. Flange portion 84 may extend longitudinally along the panel portion 82. Flange portion 84 may be shaped and dimensioned to fit through the aperture 64.

Figure 5:
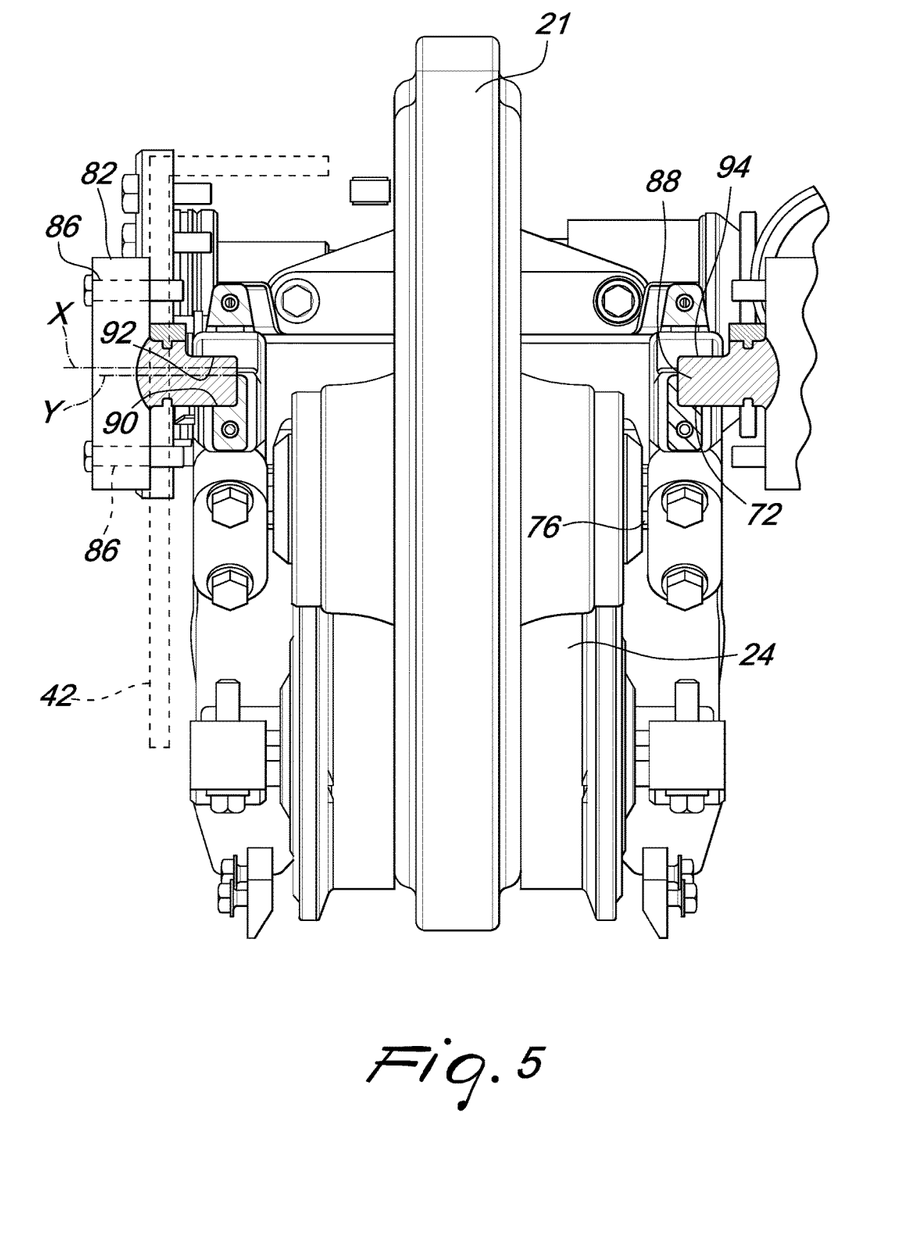
FIG. 5 is a front view of a partially disassembled idler assembly according to the present disclosure.

With reference to FIG. 5, panel portion 82 may have through holes 86. Holes 86 may be provided in two rows on either side of the flange portion 84. Bolts may be positioned through the holes 86 to couple the key elements 36 to the bores 66 on the first and second sides 40, 42. With the key elements 36 coupled to the first and second sides 40, 42, the inner surfaces of the panel portions 82 may abut the respective outer faces of the first and second sides 40, 42. Flange portions 82 may extend through the respective apertures 64.

Free ends of the flange portion 84 may be engagement ends 88 that engage into slots 72 of the first and second arms 60, 62. The engagement ends 88 may be machined so as to have a sliding fit in the slots 72. Flange portions 84 may slide in the respective slots 72 along a longitudinal direction. The longitudinal movement of the yoke element 34 relative to the housing element 32 may correspond to the sliding arrangement between the flange portions 84 and the respective slots 72. The engagement ends 88 may have a quadrilateral cross section so as to fit into slots 72 having a square cross section. In an embodiment, the width of the slots 72 may be greater relative to the width of the respective flange portions 84.

Key elements 36 may be configured to engage in the respective slots 72 so as to position yoke element 34 at a pre-determined vertical position relative to the housing element 32. The key element 36 may be mountable to the housing element 32 in a first or a second orientation to select the vertical position of the yoke element 34 relative to the housing element 32.

A center plane X of the panel portion 82 may be positioned between the rows of holes 86. Center plane X may be generally aligned with the center of the panel portion 82. Center plane X may be aligned with the center of the panel portion 82 with respect to the width thereof. Center plane X may extend longitudinally along the panel portion 82.

The flange portion 84 may have a centre plane Y. Centre plane Y may be generally aligned with the center of the flange portion 84. Center plane Y may be aligned with the center of the flange portion 84 with respect to the width thereof. Center plane Y may extend longitudinally along the flange portion 84.

The centre plane Y may be parallel to the center plane X. Each flange portion 84 may be offset relative to the centre plane X. The centre plane Y may be offset relative to the center plane X.

Each engagement end 88 of the flange portion 84 may have a first contact surface 90 and a second contact surface 92. The first and second contact surfaces 90, 92 may be formed on the sides of the engagement end 88 and may be substantially orthogonal to the idler wheel 21. The first and second contact surfaces 90, 92 may be substantially orthogonal to the vertical axis of the idler wheel 21. The first and second contact surfaces 90, 92 may be substantially orthogonal to the inner surface of the panel portion 82. The first and second contact surfaces 90, 92 may be substantially parallel to the centre plane X. The first and second contact surfaces 90, 92 may be substantially parallel to the centre plane Y.

The first contact surfaces 90 may be further from the centre plane X relative to the second contact surface 92. Centre plane X may be closer to the second contact surface 92 relative to the first contact surface 90.

With reference to FIG. 3, each slot 72 may have an abutment surface 94. The abutment surface 94 may be the upper surface of the slot 72. The abutment surface 94 may be substantially orthogonal to the idler wheel 21. The abutment surface 94 may be substantially orthogonal to the vertical axis of the idler wheel 21. The abutment surface 94 may be substantially parallel to the centre plane X. The abutment surface 94 may be substantially parallel to the centre plane Y.

With reference to FIG. 5, either the first or the second contact surfaces 90, 92 may contact the respective abutment surfaces 94 when the flange portions 84 are engaged in the respective slots 72. The first contact surface 90 or the second contact surface 92 may be selected by rotating the key element 36 about 180 degrees. In the first orientation, the first contact surface 90 may be made available to contact the abutment surface 94. Rotating the key element about 180 degrees, in the second orientation, the second contact surface 92 may be made available to contact the abutment surface 94.

In the first orientation, as the first contact surface 90 may be further from the centre plane X the abutment surface 94 is positioned at a relatively higher vertical position. In the second orientation, as the second contact surface 92 may be closer to the centre plane X the abutment surface 94 is positioned at a relatively lower vertical position. Accordingly, the yoke element 34 may be raised or lowered relative to the housing element 32 by the selection between the first and second contact surfaces 90, 92 of the flange portion 84 in the key element 36 being made available to contact the respective abutment surfaces 94 of the slots 72 in the first and second arms 60, 62.

Figure 6:
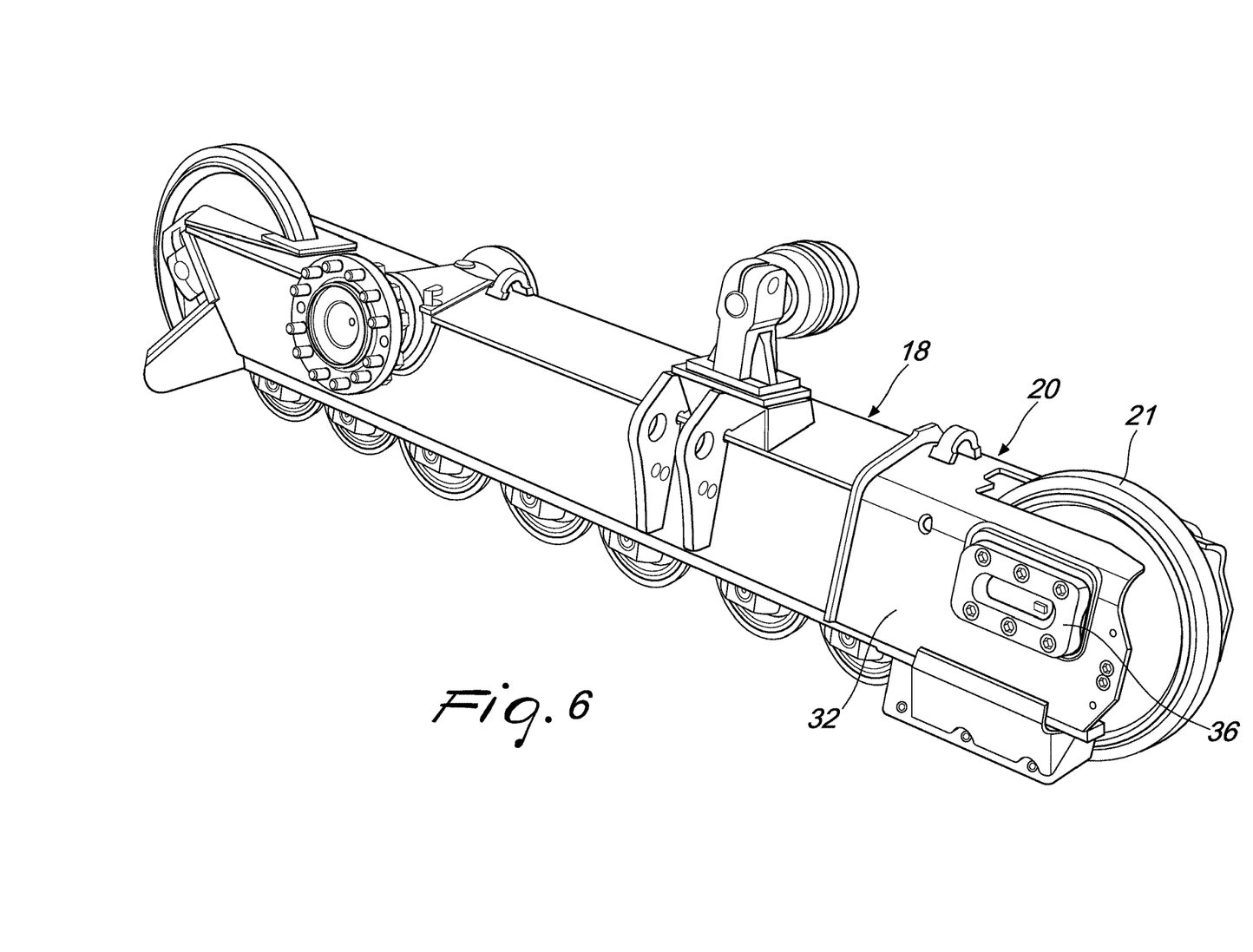
FIG. 6 is an isometric view of the track roller frame comprising the idler assembly according to the present disclosure.

With reference to FIG. 6, in an embodiment, the housing element 32 may be formed as a monolithic structure with the track roller frame 18. The track roller frame 18 that is formed as a single fabricated or cast component may comprise the housing element 32. The housing element 32 may be connected to an end of the track roller frame 18. The track roller frame 18 may further comprise the yoke element 34 that is connected to the piston 68. The piston 68 extends and retracts in a piston chamber provided in the track roller frame 18 such that the yoke element 34 moves correspondingly guided by the key element 36 coupled to the yoke element 34.

A method of assembling an idler assembly 20 to the track roller frame 18 may comprise the following steps. The housing element 32 may be connected to an end of the track roller frame 18 wherein the housing element 32 has a central cavity 38. The yoke element 34 may be connected to a longitudinally extending piston 68 provided in the track roller frame 18 wherein the yoke element 34 has spaced apart first and second arms 60, 62. The yoke element 34 may be disposed in the central cavity 38. The yoke element 34 may be coupled to the housing element 32 wherein the yoke element 34 is movable relative to the housing element 32 and wherein the yoke element 34 is coupled to the housing element 32 by at least one key element 36. The idler wheel 21 may be rotatably supported between the first and second arms 60, 62.

The skilled person would appreciate that foregoing embodiments may be modified or combined to obtain the idler assembly 20 of the present disclosure.

INDUSTRIAL APPLICABILITY

This disclosure describes an idler assembly 20 for supporting an idler wheel 21 on a track roller frame 18. The idler assembly 20 may comprise a few parts and may be manufactured efficiently and at a lower cost.

The idler assembly 20 may be moved along the longitudinal direction of the track roller frame 18 by the piston 68. Idler assembly 20 may be moved relative to the track roller frame 18 to ensure that the track chain 28 is always under the required tension so as to dampen any load.

The height of the idler wheel 21 may be adjusted through corresponding change of the height of the yoke element 34 relative to the track roller frame 18. The height of the yoke element 34 may be adjusted by selecting between two orientations of the key element 36. In a first orientation the first contact surface 90 of the flange portion 84 is higher relative to the second contact surface 92 in the second orientation. The change between first and second orientation may be effected by rotating the key element 36 about 180 degrees.

The selection between the first and second orientation correspondingly changes the height of the yoke element 34 and the idler wheel 21 relative to the track roller frame 18. The selection between the first and second orientation of the key element 36 correspondingly changes the height of the yoke element 34 and the idler wheel 21 relative to a track type machine 10 coupled with the track roller frame 18.

The key elements 36 may enable changing the vertical position of the yoke element 34 while still allowing relative movement between housing element 32 and yoke element 34 in the longitudinal direction. Key elements 36 fit in apertures 64 in one of two specific orientations. With the specific orientations in the apertures 64 any further movement may be prevented.

The height of the yoke element 34 may be further adjusted by addition of a shim between the key element 36 and an edge of the aperture 64 of the housing element 32. The shim may be placed under the flange portion 84 to raise the key element 36 relative to the housing element 32 or above the flange portion 84 to lower the key element 36 relative to the housing element 32.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. An idler assembly for a track roller frame, the idler assembly comprising:
    a housing element having a central cavity, the housing element being connectable to an end of the track roller frame;
    a yoke element being movably disposed in central cavity and having spaced apart first and second arms, the yoke element being connectable to a longitudinally extending piston in the track roller frame;
    at least one key element coupling the yoke element to the housing element such that the yoke element is movable relative to the housing element; and
    an idler wheel rotatably supported between the first and second arms.

2. The idler assembly of claim 1 wherein the housing element has opposed first and second sides and wherein the at least one key element extends through at least one aperture provided on the first or the second side.

3. The idler assembly of claim 1 wherein the yoke element is longitudinally movable relative to the housing element.

4. The idler assembly of claim 3 wherein the at least one key element engages a longitudinally extending slot provided on the first or second arm, the slot facing the first or second side.

5. The idler assembly of claim 4 wherein two key elements engage respective longitudinally extending slots provided on the first and second arm, the slots facing respective first and second sides.

6. The idler assembly of claim 5 wherein each key element has a flange portion to slidingly engage the slots.

7. The idler assembly of claim 6 wherein the key element has a panel portion with a center plane and the flange portion has a center plane offset relative to the center plane of the panel portion.

8. The idler assembly of claim 7 wherein the key element is mountable to the housing element in a first or a second orientation to select the vertical position of the yoke element relative to the housing element.

9. The idler assembly of claim 7 wherein the flange portion has first and second contact surfaces substantially parallel to the center plane of the panel portion wherein the first contact surface may be further from the center plane of the panel portion relative to the second contact surface.

10. The idler assembly of claim 6, wherein the width of the slots is greater relative to the width of the respective flange portions.

11. The idler assembly of claim 2 further comprising an opening disposed between the first and second sides wherein the idler wheel extends through the opening.

12. The idler assembly of claim 1 wherein the yoke element has a base connecting the first arm to the second arm, the base being configured for connection to the piston.

13. A track roller frame of a track type machine, the track roller frame comprising:
    an idler assembly according to any one of preceding claims wherein the housing element is connected to the end of the track roller frame and the yoke element is connected to the longitudinally extending piston in the track roller frame.

14. The track roller frame of claim 13 wherein the piston extends and retracts in a piston chamber provided in the track roller frame such that the yoke element moves correspondingly guided by the key element coupled to the yoke element.

15. A method of assembling an idler assembly to a track roller frame, the method comprising the steps of:
    connecting a housing element to an end of the track roller frame, the housing element having a central cavity;
    connecting a yoke element to a longitudinally extending piston provided in the track roller frame, the yoke element having spaced apart first and second arms;
    disposing the yoke element in the central cavity;
    coupling the yoke element to the housing element wherein the yoke element is movable relative to the housing element, the yoke element being coupled to the housing element by at least one key element; and
    supporting an idler wheel rotatably between the first and second arms.

\* \* \* \* \*